United States Patent
Clements

(10) Patent No.: US 10,938,687 B2
(45) Date of Patent: Mar. 2, 2021

(54) ENABLING DEVICE UNDER TEST CONFERENCING VIA A COLLABORATION PLATFORM

(71) Applicant: Accenture Global Solutions Limited, Dublin (IE)

(72) Inventor: Stephen Clements, County Dublin (IE)

(73) Assignee: Accenture Global Solutions Limited, Dublin (IE)

( * ) Notice: Subject to any disclaimer, the term of this patent is extended or adjusted under 35 U.S.C. 154(b) by 224 days.

(21) Appl. No.: 15/472,690

(22) Filed: Mar. 29, 2017

(65) Prior Publication Data

US 2018/0287906 A1    Oct. 4, 2018

(51) Int. Cl.
*G06F 15/173*    (2006.01)
*H04L 12/26*    (2006.01)
(Continued)

(52) U.S. Cl.
CPC ........ *H04L 43/065* (2013.01); *G06F 11/2294* (2013.01); *G06F 11/321* (2013.01);
(Continued)

(58) Field of Classification Search
CPC ... G06F 11/321; G06Q 10/101; H04L 1/0001; H04L 43/16; H04L 65/403; H04L 67/303; H04W 88/181
(Continued)

(56) References Cited

U.S. PATENT DOCUMENTS 6,806,715 B1 * 10/2004 Domadia ........... G01R 31/2635
324/414
8,850,398 B1 *  9/2014 L'Heureux ......... G06F 11/3692
705/7.25
(Continued)

FOREIGN PATENT DOCUMENTS

EP    2 527 587 A2    11/2012
EP    2 530 997 A1    12/2012
(Continued)

OTHER PUBLICATIONS

Title: Federal Communications Commision (FCC) record Author: Dennis R. Patrick; James H. Quello; Patricia Diaz Dennis Date: May 22-Jun. 2, 1989 Pertinent pp. 5158-5159.*
(Continued)

*Primary Examiner* — Hannah S Wang
(74) *Attorney, Agent, or Firm* — Harrity & Harrity, LLP

(57) ABSTRACT

A device may perform a testing operation on a device under test. The device may obtain test result data based on performing the testing operation on the device under test. The device may identify a user device that is to receive the test result data associated with the device under test from the device and via a network. The device may be in communication with a set of user devices via the network. The set of user devices may include the user device. The user device may control operation of the device. The device may determine network condition information associated with the user device and the network. The device may provide, using a
(Continued)

technique that is based on the network condition information, the test result data to the user device. The user device may receive the test result data based on controlling operation of the device.

20 Claims, 8 Drawing Sheets

(51) Int. Cl.
| | | |
|---|---|---|
| H04L 1/00 | (2006.01) | |
| G06F 11/22 | (2006.01) | |
| H04W 88/18 | (2009.01) | |
| G06F 11/32 | (2006.01) | |
| G06Q 10/10 | (2012.01) | |
| H04L 29/06 | (2006.01) | |
| H04L 29/08 | (2006.01) | |

(52) U.S. Cl.
CPC ......... *G06Q 10/101* (2013.01); *H04L 1/0001* (2013.01); *H04L 1/0014* (2013.01); *H04L 43/16* (2013.01); *H04L 65/403* (2013.01); *H04L 67/303* (2013.01); *H04W 88/181* (2013.01)

(58) Field of Classification Search
USPC ......................................................... 709/224
See application file for complete search history.

(56) References Cited

U.S. PATENT DOCUMENTS

| | | | | |
|---|---|---|---|---|
| 9,679,090 | B1* | 6/2017 | Marolia | G06F 11/3688 |
| 9,774,686 | B1* | 9/2017 | Saint-Hilaire | H04L 41/0816 |
| 2001/0008556 | A1* | 7/2001 | Bauer | H04L 12/6418 |
| | | | | 379/265.06 |
| 2005/0271399 | A1* | 12/2005 | Shigeta | H04N 1/00002 |
| | | | | 399/8 |
| 2006/0271327 | A1* | 11/2006 | Haggerty | G06F 11/3696 |
| | | | | 702/121 |
| 2007/0064604 | A1 | 3/2007 | Chen et al. | |
| 2008/0155354 | A1* | 6/2008 | Kolman | G01R 31/31912 |
| | | | | 714/45 |
| 2008/0209441 | A1* | 8/2008 | Septon | G06Q 30/02 |
| | | | | 719/318 |
| 2008/0212942 | A1 | 9/2008 | Gordon et al. | |
| 2009/0141939 | A1* | 6/2009 | Chambers | G06K 9/3241 |
| | | | | 382/103 |
| 2010/0023294 | A1 | 1/2010 | Fan et al. | |
| 2013/0064521 | A1 | 3/2013 | Gonsalves et al. | |
| 2013/0124136 | A1* | 5/2013 | Neeley | G06F 11/2294 |
| | | | | 702/122 |
| 2013/0128947 | A1* | 5/2013 | Fryer | H04N 21/2343 |
| | | | | 375/240.01 |
| 2013/0019242 | A1 | 7/2013 | Chen et al. | |
| 2013/0212149 | A1 | 8/2013 | Frenz | |
| 2014/0187173 | A1* | 7/2014 | Partee | H04L 43/045 |
| | | | | 455/67.12 |
| 2014/0250328 | A1* | 9/2014 | Schnizler | G01R 31/3177 |
| | | | | 714/31 |
| 2014/0258778 | A1* | 9/2014 | Kimm | G06F 11/2294 |
| | | | | 714/25 |
| 2014/0269386 | A1* | 9/2014 | Chu | H04L 41/22 |
| | | | | 370/252 |
| 2015/0016285 | A1* | 1/2015 | Yuan | H04L 41/5009 |
| | | | | 370/252 |
| 2015/0278076 | A1* | 10/2015 | BS | G06F 11/3664 |
| | | | | 714/38.1 |
| 2016/0127379 | A1* | 5/2016 | Nayshtut | H04W 12/0027 |
| | | | | 726/1 |
| 2016/0247517 | A1* | 8/2016 | Assem Aly Salama | |
| | | | | G10L 19/0018 |
| 2017/0013121 | A1* | 1/2017 | Baeder | H04M 3/00 |
| 2017/0127101 | A1* | 5/2017 | Rasool | H04N 21/6125 |
| 2018/0013782 | A1* | 1/2018 | Choyi | H04L 63/0892 |
| 2018/0189343 | A1* | 7/2018 | Embiricos | G06F 16/2358 |

FOREIGN PATENT DOCUMENTS

| | | |
|---|---|---|
| WO | WO 2016/055811 | 4/2016 |
| WO | WO 2017/014846 | 1/2017 |

OTHER PUBLICATIONS

Kimura, N. et al., "A Survey on Data Compression in Wireless Sensor Networks," International Conference on Information Technology: Coding and Computing (ITCC'05)—vol. II, Apr. 2005, 6 pages.

Extended European Search report corresponding to EP 18 16 2494, dated Jul. 31, 2018, 15 pages.

* cited by examiner

ENABLING DEVICE UNDER TEST CONFERENCING VIA A COLLABORATION PLATFORM

BACKGROUND

A device under test (DUT), also known as an equipment under test (EUT), an application under test (AUT), and/or a unit under test (UUT), is a term used to refer to a manufactured product undergoing testing, either at first manufacture or in a later stage of the DUT's life cycle as part of ongoing functional testing and calibration checks.

SUMMARY

In some possible implementations, a device may include one or more processors to perform a testing operation on a device under test. The one or more processors may obtain test result data based on performing the testing operation on the device under test. The one or more processors may identify a user device that is to receive the test result data associated with the device under test from the device and via a network. The device may be in communication with a set of user devices via the network. The set of user devices may include the user device. The user device may control operation of the device. The one or more processors may determine network condition information associated with the user device and the network. The one or more processors may provide, using a technique that is based on the network condition information, the test result data to the user device. The user device may receive the test result data based on controlling operation of the device.

In some possible implementations, a method may include performing, by a device, a testing operation on a device under test. A user device may control operation of the device. The method may include obtaining, by the device, test result data based on the testing operation. The method may include identifying, by the device, the user device that is to receive the test result data associated with the device under test from the device and via a network. The device may be in communication with a set of user devices via the network. The set of user devices may include the user device. The method may include determining, by the device, network condition information associated with the user device and the network. The method may include performing, by the device, a technique based on the network condition information. The method may include providing, by the device and to the user device, the test result data associated with the device under test based on performing the technique.

In some possible implementations, a non-transitory computer-readable medium may store one or more instructions that, when executed by one or more processors of a device, cause the one or more processors to receive, from a device under test, test result data associated with the device under test. The one or more instructions may cause the one or more processors to identify a user device, from a set of user devices, that is to receive the test result data associated with the device under test. The device may be in communication with the set of user devices via a network. The user device may control operation of the device. The one or more instructions may cause the one or more processors to determine network condition information associated with the user device and the network. The one or more instructions may cause the one or more processors to provide, to the user device, the test result data associated with the device under test based on the network condition information to permit the user device to provide, via an output component, the test result data associated with the device under test.

DETAILED DESCRIPTION

Figure 1:
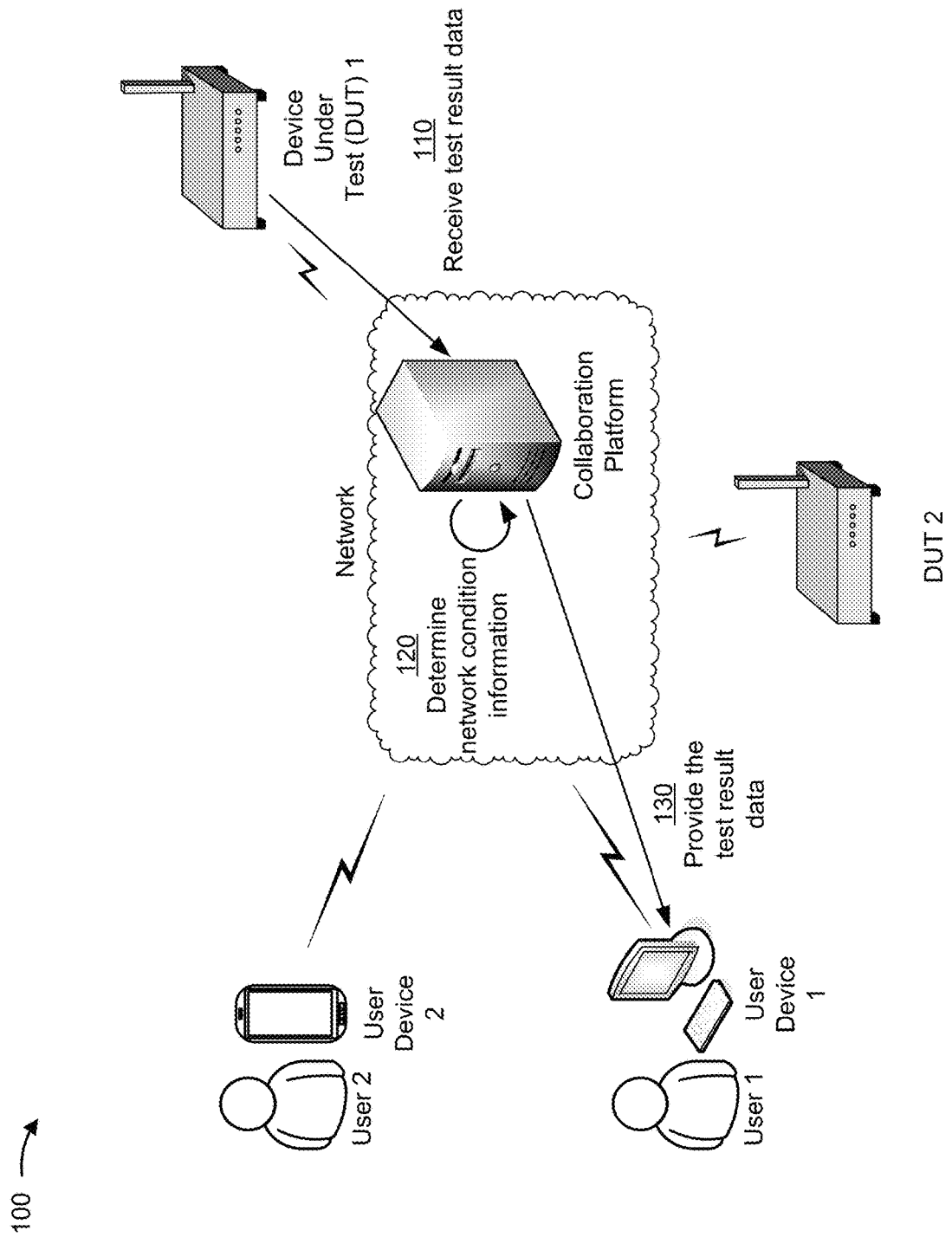
FIG. 1 is a diagram of an overview of an example implementation described herein.

The following detailed description of example implementations refers to the accompanying drawings. The same reference numbers in different drawings may identify the same or similar elements.

A user may desire to use a user device (e.g., a laptop computer, a mobile phone, etc.) to remotely (e.g., via a network) test a DUT (e.g., a set-top box, a desktop computer, an Internet of Things (IoT) device, a vending machine, or the like), interact with the DUT, monitor the DUT, or the like. In this case, the DUT may provide, to the user device, test result data that the user device may provide, via an output component (e.g., a display, a speaker, or the like), to enable the user to perform testing and/or monitoring. As such, the ability of the user device to receive and provide, via the output component, test result data associated with the DUT in real-time (e.g., substantially concurrently with the DUT generating the information) may be necessary to enable adequate testing of the DUT. However, in some cases, communication issues associated with a network, such as high latency, low throughput, packet loss, etc. can inhibit the scalability, viability, and/or efficacy of such remote testing of DUTs.

Implementations described herein provide connectivity (e.g., conferencing) of a set of DUTs and a set of user devices via a collaboration platform (e.g., a set of cloud servers executing a collaboration service, a device that enables a user device to control and perform testing operations on a DUT remotely such as via a network, or the like). The collaboration platform may receive, from a DUT, test result data that is to be provided to one or more user devices, such that the one or more user devices may provide, via output components, the test result data for diagnostic purposes and/or other purposes. The collaboration platform may identify a user device that is to receive the test result data (e.g., based on a request from the user device, based on a configuration, based on an event, based on stored information, or the like), and may determine network condition information associated with a connection between the collaboration platform and the user device (e.g., a latency value, a bandwidth value, a throughput value, a jitter value, an amount of packet loss, etc.).

The collaboration platform may provide, to the user device, the test result data based on the network condition information. For example, the collaboration platform may perform a technique (e.g., an encoding technique, a scaling technique, a transcoding technique, a compression technique, or the like) to reduce communication issues and improve the transmission of test result data to the user device, such that testing efficacy is not compromised by current network conditions. In this way, some implementations described herein reduce latency, reduce an amount of packet loss, etc., thereby conserving processor and/or memory resources of user devices, and thereby enabling remote testing of DUTs via a network.

FIG. 1 is a diagram of an overview of an example implementation 100 described herein. As shown in FIG. 1, example implementation 100 may include a set of user devices, a set of DUTs, and a collaboration platform capable of enabling conferencing between the user devices and the DUTs. As shown by reference number 110, the collaboration platform may receive test result data from DUT 1 (e.g., a set-top box, a device executing a web application, a device executing a mobile application, or the like). For example, the collaboration platform may receive, in real-time, the test result data that is generated by DUT 1. In some implementations, DUT 1 may generate the test result data based on executing a test case, based on receiving an input from a user device, based on detecting an event, or the like.

As shown by reference number 120, the collaboration platform may determine network condition information associated with a user device and a network. For example, the collaboration platform may determine network condition information, such as a bandwidth value, a throughput value, a goodput value, a jitter value, a latency value, an amount of packet loss, or the like. Based on the network condition information, the collaboration platform may perform a technique (e.g., an encoding technique, a scaling technique, a transcoding technique, a compression technique, a technique to flag the test result data as high priority, etc.) to reduce communication issues and/or improve transmission of the test result data to the user device.

In some implementations, the collaboration platform may identify a user device that is to receive the test result data, and determine network condition information associated with the user device. For example, the user device may establish, via a network, a connection with the collaboration platform, and the collaboration platform may determine the network condition information based on the connection (e.g., may measure a bandwidth value, a latency value, or the like).

As shown by reference number 130, the collaboration platform may provide the test result data. For example, the collaboration platform may provide, to User Device 1, test result data based on performing the technique. Additionally, User Device 1 may receive the test result data from the collaboration platform, and provide, via one or more output components, the test result data.

In this way, the collaboration platform may provide information from the DUT(s) to the user device(s) based on network conditions and based on performing a technique to reduce communication issues and/or improve transmission of the test result data to the user device(s), thereby reducing latency, increasing throughput, reducing packet loss, and/or the like.

As indicated above, FIG. 1 is provided merely as an example. Other examples are possible and may differ from what was described with regard to FIG. 1. While a particular number of DUTs and/or user devices are shown in FIG. 1, other implementations include other numbers of DUTs and/or user devices.

Figure 2:
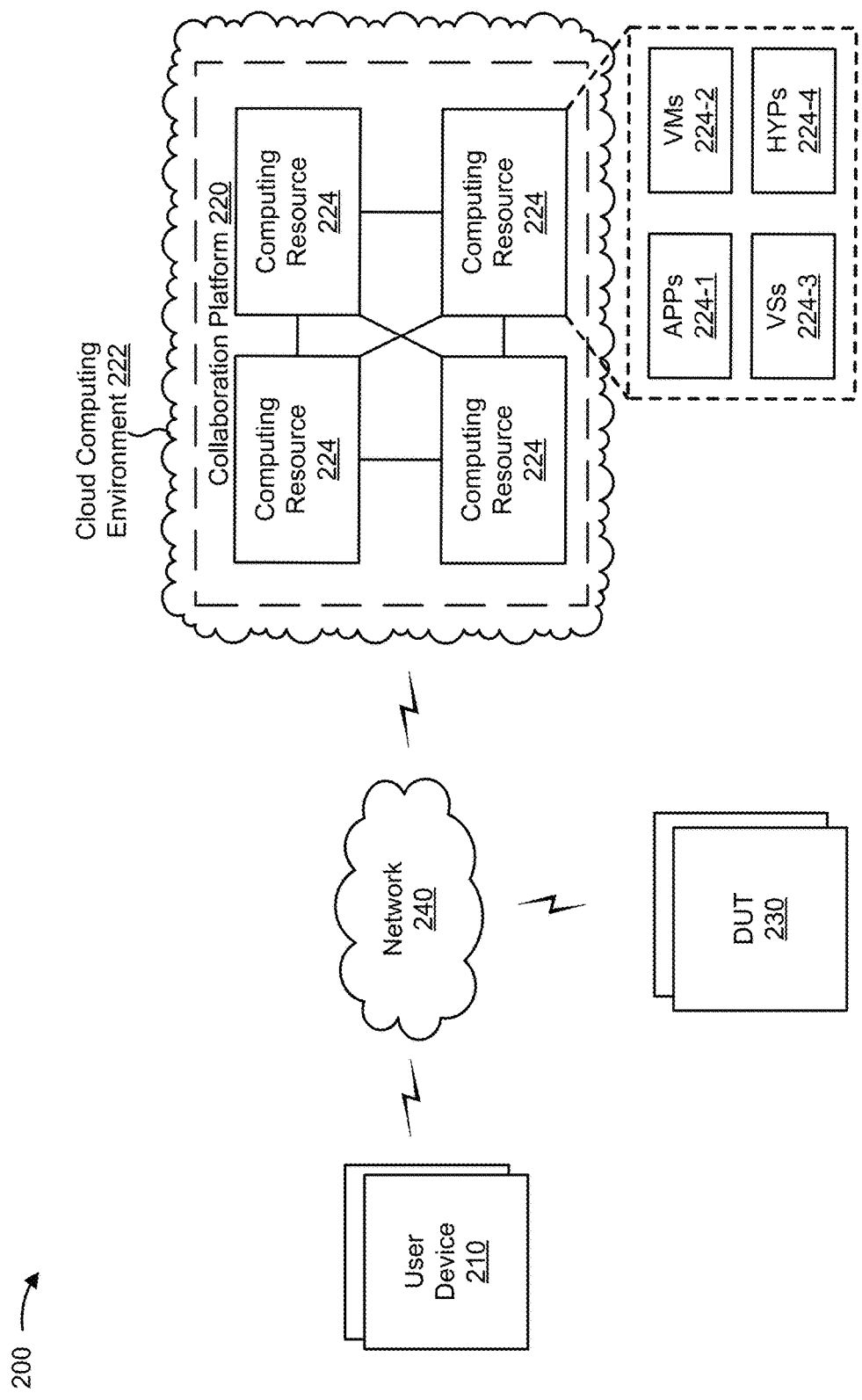
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a set of user devices 210, a collaboration platform 220, a set of DUTs 230, and a network 240. Devices of environment 200 may interconnect via wired connections, wireless connections, or a combination of wired and wireless connections.

User device 210 includes one or more devices capable of receiving, generating, storing, processing, and/or providing information associated with collaboration platform 220. For example, user device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device.

Collaboration platform 220 includes one or more devices capable of enabling conferencing between user devices 210 and DUTs 230. In some implementations, collaboration platform 220 may be designed to be modular such that certain software components can be swapped in or out depending on a particular need. As such, collaboration platform 220 may be easily and/or quickly reconfigured for different uses.

In some implementations, as shown, collaboration platform 220 may be hosted in cloud computing environment 222. Notably, while implementations described herein describe collaboration platform 220 as being hosted in cloud computing environment 222, in some implementations, collaboration platform 220 may not be cloud-based (i.e., may be implemented outside of a cloud computing environment) or may be partially cloud-based.

Cloud computing environment 222 includes an environment that hosts collaboration platform 220. Cloud computing environment 222 may provide computation, software, data access, storage, etc. services that do not require end-user (e.g., user device 210) knowledge of a physical location and configuration of system(s) and/or device(s) that hosts collaboration platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host collaboration platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, or the like.

Application 224-1 includes one or more software applications that may be provided to or accessed by user device 210. Application 224-1 may eliminate a need to install and execute the software applications on user device 210. For example, application 224-1 may include software associated with collaboration platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., user device 210), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

DUT 230 includes one or more devices capable of receiving, generating, storing, processing, and/or providing test result data. For example, DUT 230 may include a set-top box, a mobile phone, a laptop computer, a tablet computer, a handheld computer, a gaming device, a wearable communication device, a computer, a portable electronic device, an IoT device, a vending machine, or a similar type of device.

Network 240 may include one or more wired and/or wireless networks. For example, network 240 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
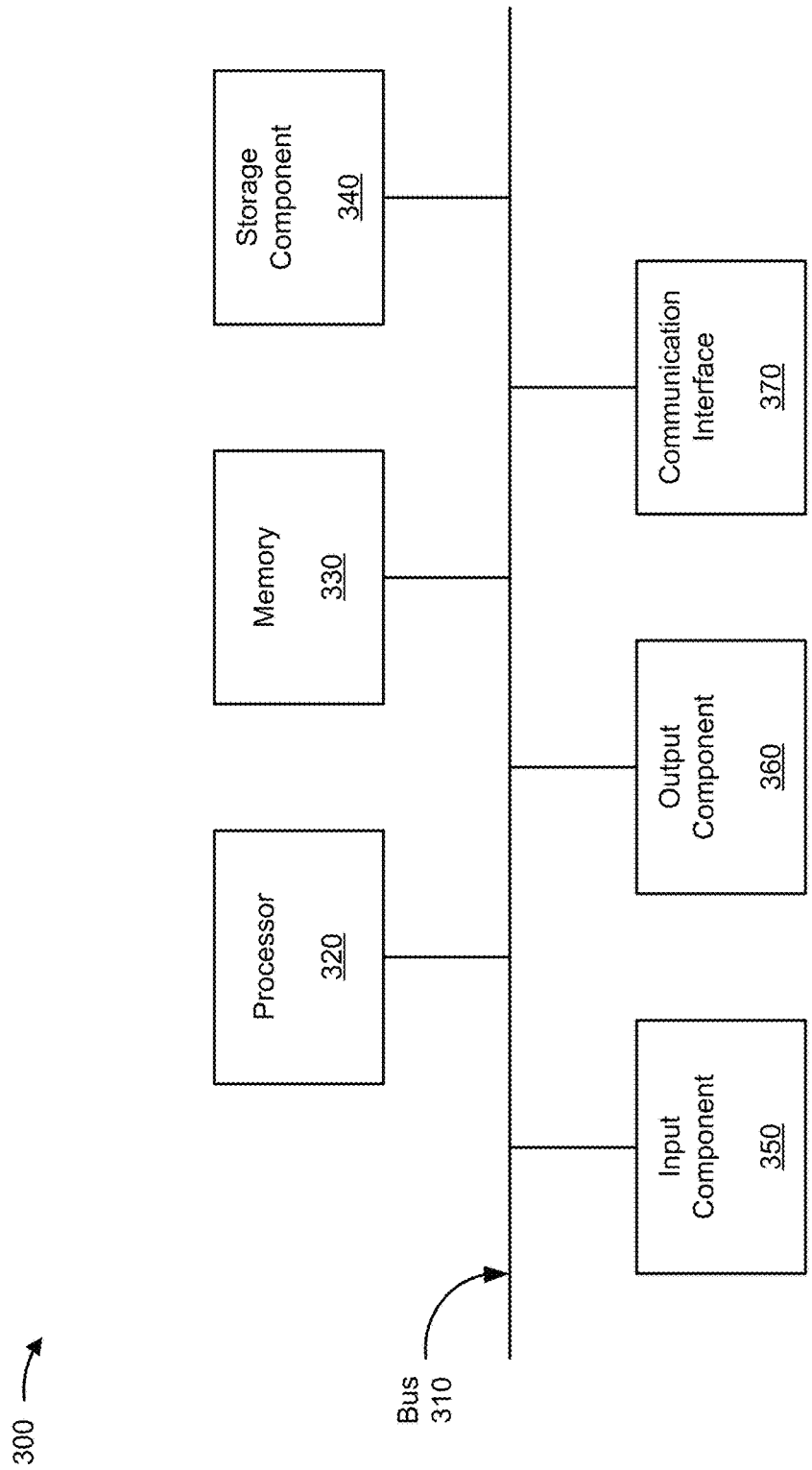
FIG. 3 is a diagram of example components of one or more devices of FIG. 2.

FIG. 3 is a diagram of example components of a device 300. Device 300 may correspond to user device 210, collaboration platform 220, and/or DUT 230. In some implementations, user device 210, collaboration platform 220, and/or DUT 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
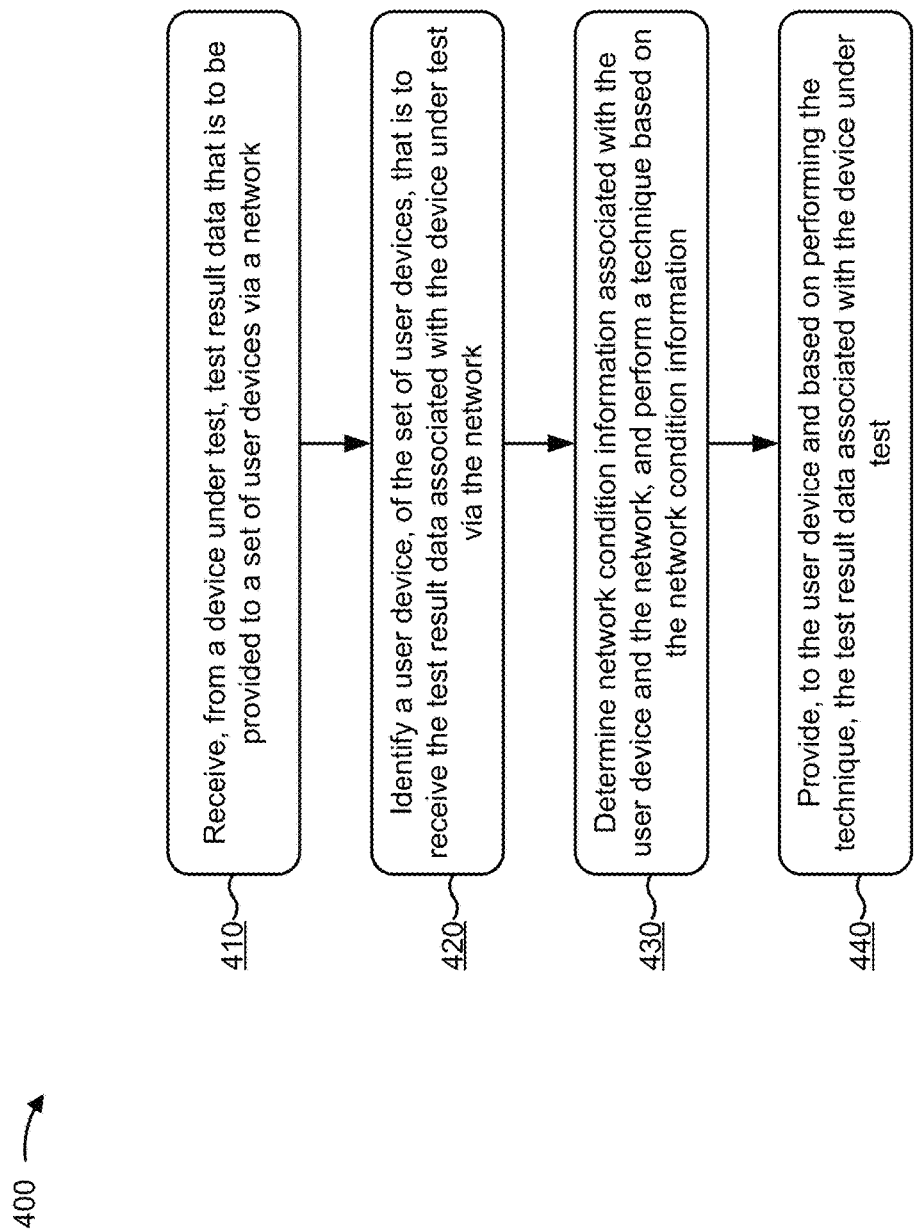
FIG. 4 is a flow chart of an example process for enabling device under test conferencing via a collaboration platform.

FIG. 4 is a flow chart of an example process 400 for enabling device under test conferencing via a collaboration platform. In some implementations, one or more process blocks of FIG. 4 may be performed by collaboration platform 220. In some implementations, one or more process blocks of FIG. 4 may be performed by another device or a group of devices separate from or including collaboration platform 220, such as user device 210, and/or DUT 230.

As shown in FIG. 4, process 400 may include receiving, from a device under test, test result data that is to be provided to a set of user devices via a network (block 410). For example, collaboration platform 220 may receive, from DUT 230, test result data associated with DUT 230 that is to be provided to a set of user devices 210. In some implementations, collaboration platform 220 may enable connectivity between a set of DUTs 230 and a set of user devices 210 via network 240. For example, user device 210 and/or DUT 230 may execute client applications that enable usage of collaboration platform 220 and/or enable communication between user device 210 and DUT 230 (e.g., to establish a conference between user devices 210 and DUTs 230, to establish another type of communication session, or the like).

In some implementations, collaboration platform 220 may perform a testing operation on DUT 230. For example, collaboration platform 220 may provide, to DUT 230, an input that causes DUT 230 to generate an output. Additionally, or alternatively, collaboration platform 220 may provide, to DUT 230, information associated with a test suite, and DUT 230 may execute a set of test cases associated with the test suite. Additionally, or alternatively, DUT 230 may generate test result data, and provide the test result data to collaboration platform 220. In this way, collaboration platform 220 may obtain test result data based on performing the testing operation on DUT 230.

In some implementations, user device 210 may control an operation of collaboration platform 220 which may cause collaboration platform 220 to perform a testing operation on DUT 230. In some implementations, user device 210 may be remotely located from collaboration platform 220 and/or DUT 230 (e.g., a threshold geographical distance, or the like). Additionally, or alternatively, user device 210 may communicate with collaboration platform 220 and/or DUT 230 via network 240.

In some implementations, collaboration platform 220 may enable various types of communication sessions between the set of user devices 210 and DUTs 230 that enable various types of information to be exchanged between devices (e.g., test result data, such as multimedia information, video information, audio information, text information, or the like). In some implementations, collaboration platform 220 may receive information from one or more DUTs 230, and may provide the information to one or more user devices 210 via network 240. In this way, and as described elsewhere herein, collaboration platform 220 enables remote testing, monitoring, etc. of DUTs 230.

In some implementations, information associated with DUT 230 may include status information. For example, status information may include information that identifies a status of DUT 230. In some implementations, the status information may identify an availability of DUT 230 (e.g., available, unavailable, an expected time of availability, a schedule of available times, etc.). Additionally, or alternatively, the status information may identify user device 210 that is interacting with DUT 230. In some implementations, each DUT 230 and user device 210 may provide, to collaboration platform 220, status information. Additionally, or alternatively, user devices 210 may provide, for display, respective statuses of other user devices 210 and/or DUTs 230 that are in communication with collaboration platform 220.

In some implementations, the information associated with DUT 230 may include testing information (e.g., test result data, or the like). For example, the testing information may identify a current test suite (e.g., a set of test cases, test scripts, etc.) that is being executed by DUT 230. Additionally, or alternatively, the information may identify a number of test cases that have been executed as compared to a total number of test cases in the test suite (e.g., a percentage of the test suite that has been executed, or the like). Additionally, or alternatively, the testing information may identify respective statuses of various test cases (e.g., pass, fail, error, inconclusive, etc.). Additionally, or alternatively, the information may identify an elapsed time of the execution of the test suite, an expected remaining duration, or the like.

In some implementations, the information associated with DUT 230 may include text information. In some implementations, collaboration platform 220 may establish a text communication channel (e.g., or an instant messaging channel) between user device 210 and DUT 230. For example, user device 210 may provide, to DUT 230, text information, such as a command, a query, a request, an instruction, or the like. As a particular example, user device 210 may provide a command, such as "press button 'TV guide'," and DUT 230 may execute the command, and/or may provide a response to user device 210 (e.g., an output of DUT 230 based on DUT 230 executing the command). As another example, user device 210 may provide, to DUT 230, a command such as "get status," and DUT 230 may provide a response, such as a testing status, memory usage status, processor usage status, or the like.

In some implementations, the information associated with DUT 230 may include resource information. For example, DUT 230 may provide, to user device 210, a resource, such as a file (e.g., an image file associated with a screen capture, a log file, and/or any other type of file generated by DUT 230). Additionally, or alternatively, DUT 230 may provide, to user device 210, resource data, such as a list of components (e.g., memory, processor, etc.) and/or a list of component data (e.g., a type of memory, an available memory capacity, a type of processor, a processor capability, etc.).

In some implementations, the information associated with DUT 230 may include audio and/or video information. For example, DUT 230 may provide, to user device 210 and via collaboration platform 220, audio and/or video information that is generated by DUT 230 (e.g., generated based on DUT 230 executing a test suite, based on an input received from user device 210, or the like). In some implementations, DUT 230 may provide, to user device 210 via collaboration platform 220, the audio and/or video information in real-time, such as substantially concurrently with DUT 230 generating the information.

In some implementations, a first user device 210 may interact with DUT 230 (e.g., provide a set of inputs), and collaboration platform 220 may provide, to a set of other user devices 210, information associated with DUT 230 (e.g., generated outputs). In this way, multiple user devices 210 may provide, via output components, information associated with a particular DUT 230, thereby enabling multiple users to test and/or monitor DUT 230.

In some implementations, user device 210 may receive the information, and record the information. For example, user device 210 may record the information for playback, such that a user may later view the information. In some implementations, collaboration platform 220 may receive test result data from DUT 230, record the test result data, and/or save the test result data. For example, collaboration platform 220 may record information associated with a session (e.g., between user device 210 and DUT 230), and provide the recorded information to user device 210 and/or another user device 210 for playback. Additionally, or alternatively, collaboration platform 220 may perform testing operations on a particular DUT 230, and record the results of the testing operations. In some implementations, user device 210 may provide, to collaboration platform 220, information that requests collaboration platform 220 to record a session (e.g., conference) between user device 210, DUTs 230, and/or other user devices 210. In this way, a user and/or another user, associated with another user device 210, may view the recorded information, share the recorded information, or the like.

In some implementations, collaboration platform 220 may receive, from DUT 230, the test result data, determine a network condition associated with network 240 and/or user device 210, and provide, to user device 210, the multi-media information based on a technique and in real-time, as described elsewhere herein.

As further shown in FIG. 4, process 400 may include identifying a user device, of the set of user devices, that is to receive the test result data associated with the device under test via the network (block 420). For example, collaboration platform 220 may identify a particular user device 210, of the set of user devices 210, that is to receive the test result data associated with DUT 230 via network 240.

In some implementations, collaboration platform 220 may identify user device 210 based on a request. For example, user device 210 may provide, to collaboration platform 220, information that requests the test result data associated with DUT 230, and collaboration platform 220 may identify user device 210 based on the request. As a particular example, a user may interact with user device 210 to select a particular DUT 230. For example, the user may desire to interact with the particular DUT 230 and/or receive test result data associated with the particular DUT 230. In this case, user device 210 may provide, to collaboration platform 220, information identifying the selection of the particular DUT 230.

In some implementations, collaboration platform 220 may provide, to user device 210, information that identifies a list of DUTs 230 and/or other user devices 210 that are available for communication sessions (e.g., a user directory, a device directory, etc.). As an example, user device 210 may provide, for display via a user interface, information that identifies the list of DUTs 230 and/or other user devices 210. In some implementations, a user of user device 210 may interact with user device 210 to search the list of DUTs 230 and/or other user devices 210 (e.g., by device identifier and/or network address, by username, by device name, etc.), select particular DUTs 230 and/or user devices 210 (e.g., to interact with, to conference, etc.), register DUTs 230 to provide test result data, permit other user devices 210 to join a conference, or the like.

In some implementations, user device 210 may provide, to DUT 230, information that requests DUT 230 to perform an action. For example, user device 210 may control operation of collaboration platform 220, such that collaboration platform 220 performs testing of DUT 230. As an example, user device 210 may provide a set of resources (e.g., files associated with a test suite for DUT 230 to execute) or provide information that identifies the set of resources (e.g., a network address, and/or a memory location at which the resources may be retrieved). In this case, collaboration platform 220 may identify that user device 210 is to receive test result data associated with the execution of the test suite based on user device 210 providing the set of resources.

In some implementations, collaboration platform 220 may identify user device 210 based on an event. For example, user device 210 may provide, to collaboration platform 220, information that identifies that user device 210 is to receive test result data associated with DUT 230 based on an occurrence of an event. In some implementations, an event may be associated with testing of DUT 230. For example, the event may correspond to the completion of an execution of a test suite or a portion of the test suite, an error associated with the execution of the test suite, or the like. Additionally, or alternatively, an event may correspond to an operation of DUT 230. For example, the event may correspond to a hardware error, a software error, a resource utilization that satisfies a threshold, or the like. In some implementations, collaboration platform 220 may receive, from DUT 230, information that identifies the event, and may identify user device(s) 210 based on a configuration, such as stored information that maps user device(s) 210 and event(s).

In some implementations, collaboration platform 220 may identify a particular user device 210 that is to receive the test result data associated with DUT 230, and determine a network condition associated with network 240 and/or the identified user device 210, as described below.

As further shown in FIG. 4, process 400 may include determining network condition information associated with the user device and the network, and performing a technique based on the network condition (block 430). For example, collaboration platform 220 may determine network condition information associated with user device 210 and network 240. In some implementations, collaboration platform 220 may determine network condition information, such as information that identifies a bandwidth value, a throughput value, a goodput value, a jitter value, a latency value, an amount of packet loss, a delay value, a round-trip time value, a number of retransmissions, or the like.

In some implementations, collaboration platform 220 may determine the network condition information based on a session, such as a sequence of packets associated with a connection, between collaboration platform 220 and user device 210. For example, collaboration platform 220 may measure, based on the session, one or more of the above values associated with the network condition information.

In some implementations, collaboration platform 220 may perform a technique based on the network condition information. For example, collaboration platform 220 may perform an encoding technique, a re-encoding technique, a recoding technique, a transcoding technique, a transsizing technique, an adaptive bit rate streaming technique, a scaling technique, a compression technique, or the like, based on the network condition information. In some implementations, collaboration platform 220 may determine, based on the network condition information, that a value (e.g., a latency value, a bandwidth value, a throughput value, etc.) satisfies a threshold, and may perform the technique based on the value satisfying the threshold.

In some implementations, collaboration platform 220 may determine a set of values that correspond to a set of parameters based on the network condition information (e.g., a latency value, a bandwidth value, and a throughput value). Additionally, or alternatively, collaboration platform 220 may generate a score based on the set of values. In some implementations, collaboration platform 220 may apply weight values to the set of values, and determine a score based on applying the weight values. Additionally, or alternatively, collaboration platform 220 may determine a technique, or a set of techniques, to perform based on the score and/or the set of values. That is, collaboration platform 220 may perform a first technique based on a first score, a second technique based on a second score, etc. In this way, collaboration platform 220 may take various parameters into account when selecting and/or performing the technique.

In some implementations, collaboration platform 220 may include a set of codecs that collaboration platform 220 may use when providing test result data, and select a particular codec to use based on the network condition information. For example, a first codec may operate in an improved manner (e.g., enable lower latency, higher audio and/or video quality, etc.) in association with a first network condition (e.g., identified by first network condition information) than as compared to a second network condition (e.g., identified by second network condition information), whereas a second codec may operate in a more improved manner in association with the second network condition than as compared to the first network condition. That is, various codecs may enable lower latency, higher throughput, higher audio and/or video quality, etc. in association with different network conditions (e.g., identified by various network condition information).

In some implementations, collaboration platform 220 may include a set of codecs, and may select a particular codec based on the network condition information such that communication issues (e.g., high latency, low throughput, packet losses, etc.) are reduced than as compared to if the particular codec is not selected. In some implementations, collaboration platform 220 may select a particular codec based on first network condition information, and may select another codec based on second network condition information. For example, collaboration platform 220 may store, in a data structure, information that maps particular codecs and particular network condition information. Additionally, collaboration platform 220 may determine network condition information, and identify a particular codec based on the network condition information.

In some implementations, collaboration platform 220 may select a particular codec based on user device 210 including the particular codec and/or based on user device 210 being capable of decoding the information encoded by collaboration platform 220. Additionally, or alternatively, collaboration platform 220 may provide, to user device 210 and/or DUT 230, information that instructs user device 210 and/or DUT 230 to use a particular codec based on the network condition information.

In some implementations, collaboration platform 220 may select a particular codec based on network condition information, and may select another codec based on a change in the network condition information, based on a value satisfying a threshold, or the like. As an example, in situations where a latency value satisfies a threshold, collaboration platform 220 may use a particular codec that compresses the information associated with DUT 230 such that communication issues are reduced (e.g., thereby enabling lower latency between user device 210 and DUT 230).

In this way, collaboration platform 220 may perform a technique such that communication issues are reduced than as compared to situations where the technique is not performed, thereby conserving network resources and/or conserving user device 210 resources.

As further shown in FIG. 4, process 400 may include providing, to the user device and based on performing the technique, the test result data associated with the device under test (block 440). For example, collaboration platform 220 may provide, to user device 210 and based on performing the technique, the test result data associated with DUT 230. In this way, user device 210 may receive, from collaboration platform 220, the test result data associated with DUT 230, and may provide, via an output component, the information associated with DUT 230.

Additionally, in this way, user device 210 may receive the test result data in real-time, thereby enabling more accurate testing of DUT 230 than as compared to situations where the technique is not performed (e.g., situations associated with higher latency, a greater amount of packet loss, etc.). For example, a user of user device 210 may be capable of more accurately discerning an effect of a user-initiated action (e.g., an input provided by user device 210 to DUT 230) on DUT 230 based on the test result data being provided in real-time.

In some implementations, a user, using user device 210, may monitor and/or diagnose potential issues with DUT 230. Additionally, or alternatively, user device 210 (e.g., based on a user input) provide, to DUT 230, information based on the test result data. For example, user device 210 may provide information that includes an instruction for DUT 230 (e.g., to stop execution of a test suite, to adjust a parameter, to re-configure a setting, or the like).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
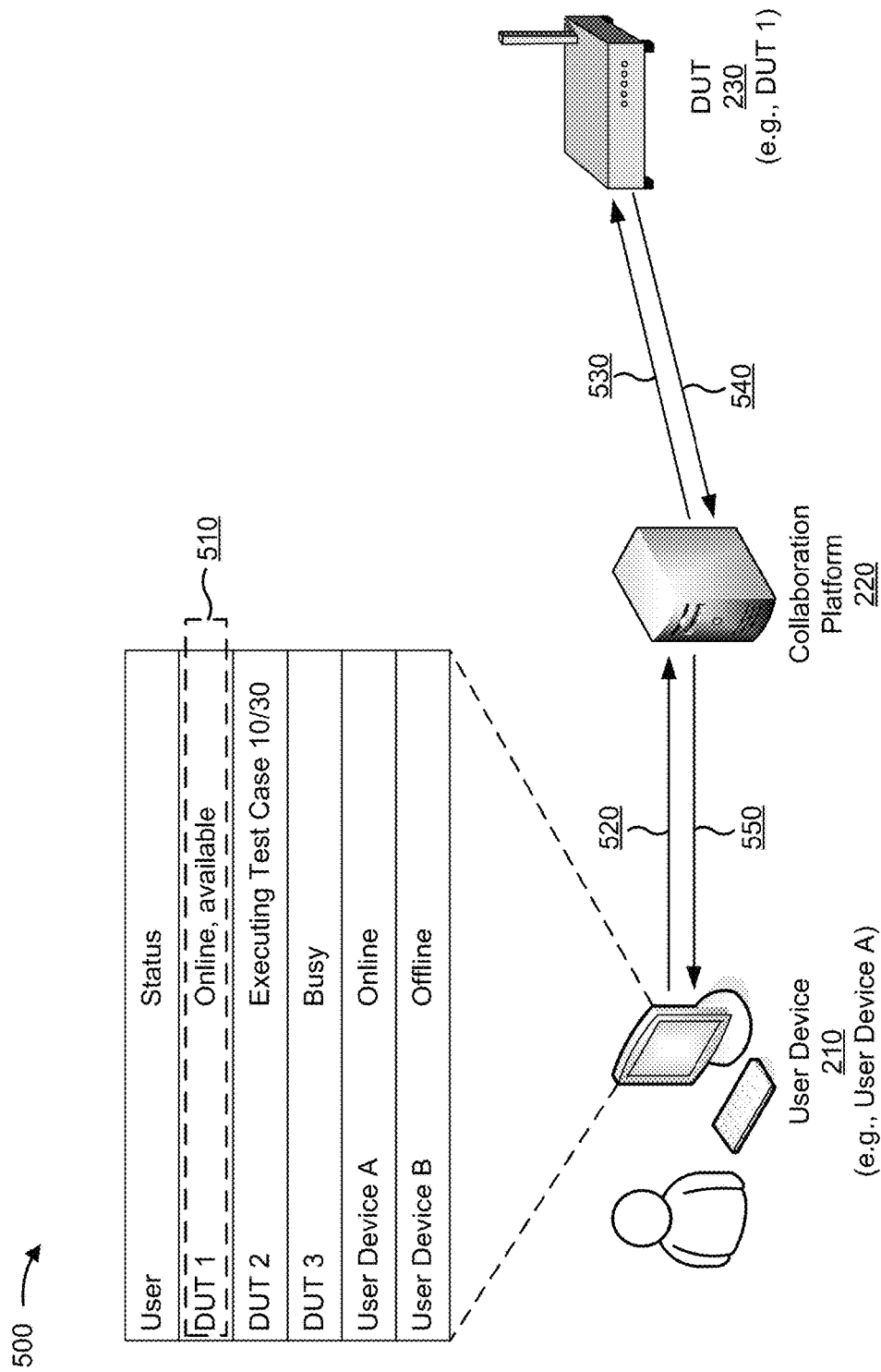
FIG. 5 is a diagram of an example implementation relating to the example process shown in FIG. 4.

FIG. 5 is a diagram of an example implementation 500 relating to the example process shown in FIG. 4. FIG. 5 shows an example of enabling device under test conferencing via a collaboration platform.

As shown in FIG. 5, a user of a particular user device 210 (e.g., User Device A) may desire to interact with and/or control a particular DUT 230 to observe an output by the particular DUT 230 (e.g., DUT 1). In this case, as shown, user device 210 may provide, for display, information identifying status information associated with a set of user devices 210 and DUTs 230 (e.g., user devices 210 and DUTs 230 that are in communication with collaboration platform 220).

As shown by reference number 510, the user may interact with user device 210 to select a particular DUT 230 (e.g., DUT 1). As shown by reference number 520, user device 210 may provide information to collaboration platform 220 (e.g., to identify DUT 230, to initiate a session with DUT 230, to request test result data from DUT 230, etc.).

As further shown in FIG. 5, and by reference number 530, collaboration platform 220 may provide, to DUT 230, a request based on the information received from user device 210. As shown by reference number 540, DUT 230 may provide test result data to collaboration platform 220 based on the request. As shown by reference number 550, collaboration platform 220 may provide, to user device 210, the test result data from DUT 230 in real-time, thereby enabling user device 210 to provide, via an output component, the test result data to enable the user to perform testing of DUT 230.

As indicated above, FIG. 5 is provided merely as an example. Other examples are possible and may differ from what was described with regard to FIG. 5.

Figure 6:
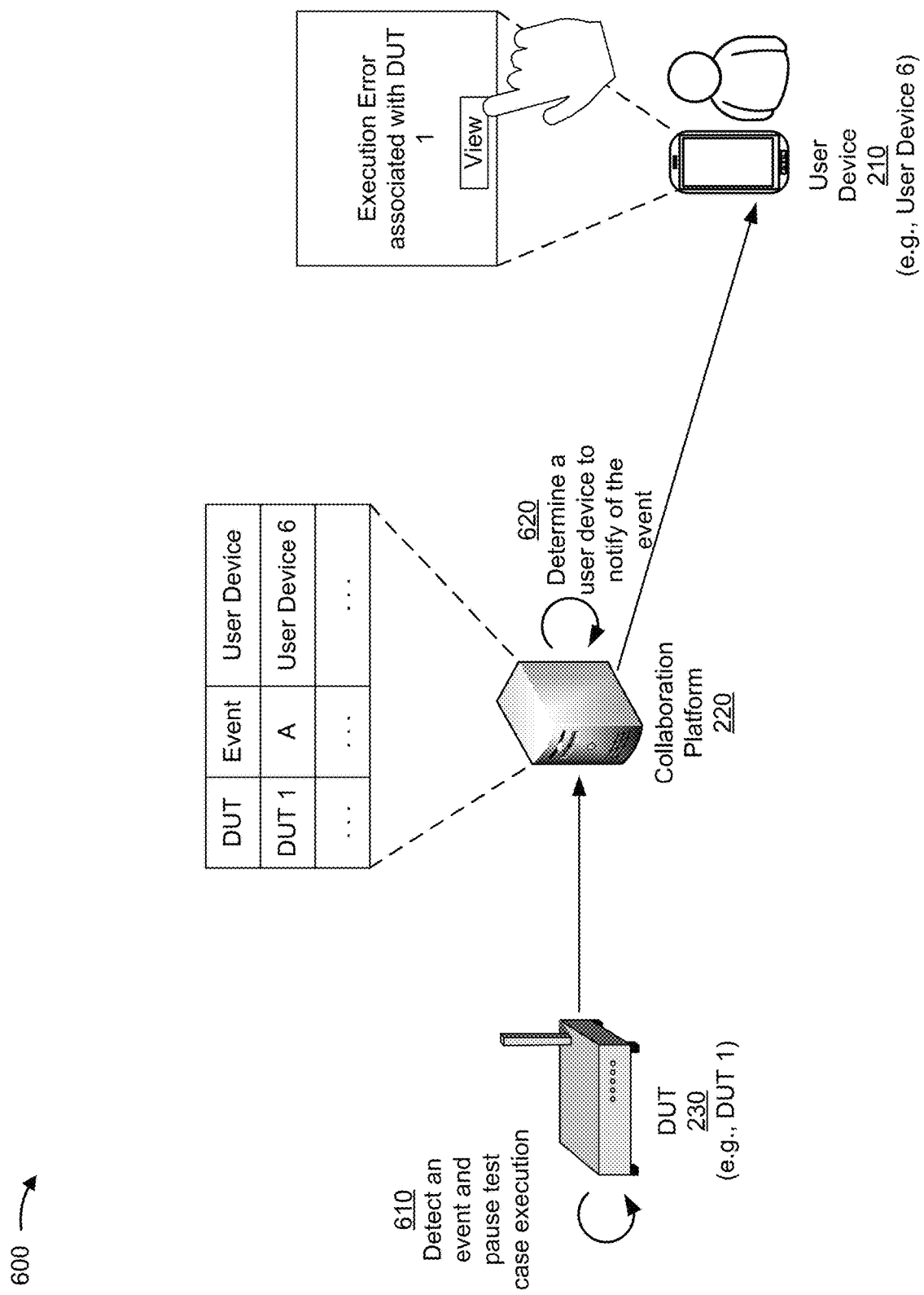
FIG. 6 is another diagram of an example implementation relating to the example process shown in FIG. 4.

FIG. 6 is a diagram of an example implementation 600 relating to the example process shown in FIG. 4. FIG. 6 shows an example of enabling device under test conferencing via a collaboration platform.

As shown in FIG. 6, a particular DUT 230 (e.g., DUT 1) may be used for automated testing (e.g., functional testing, monitoring services, or the like). As an example, assume that DUT 230 is executing a test case of a test suite. As shown by reference number 610, DUT 230 may detect an event and pause test case execution. For example, DUT 230 may determine an error associated with an execution of the test case. Additionally, DUT 230 may provide, to collaboration platform 220, information that identifies the event.

As shown by reference number 620, collaboration platform 220 may determine a particular user device 210 (e.g., User Device 6) to notify of the event. For example, collaboration platform 220 may identify user device 210 based on stored information that maps an event and a particular user device 210 to notify of an occurrence of the event. Additionally, collaboration platform 220 may provide, to user device 210, information that identifies the event.

As further shown in FIG. 6, user device 210 may provide, for display, information that identifies the event. Additionally, a user may provide an input to user device 210 (e.g., by selecting a "view" button) to cause user device 210 to request DUT 230 to share test result data associated with the test case execution, thereby enabling the user to assess the event. In alternative implementations, DUT 230 may notify multiple user devices 210 of the event (e.g., initiate a session with a list of user devices 210, automatically arrange a conference and wait for user devices 210 to join the conference, etc.). In such cases, collaboration platform 220 may notify and share information with multiple user devices 210, allowing multiple users to assess the event.

As indicated above, FIG. 6 is provided merely as an example. Other examples are possible and may differ from what was described with regard to FIG. 6.

Figure 7:
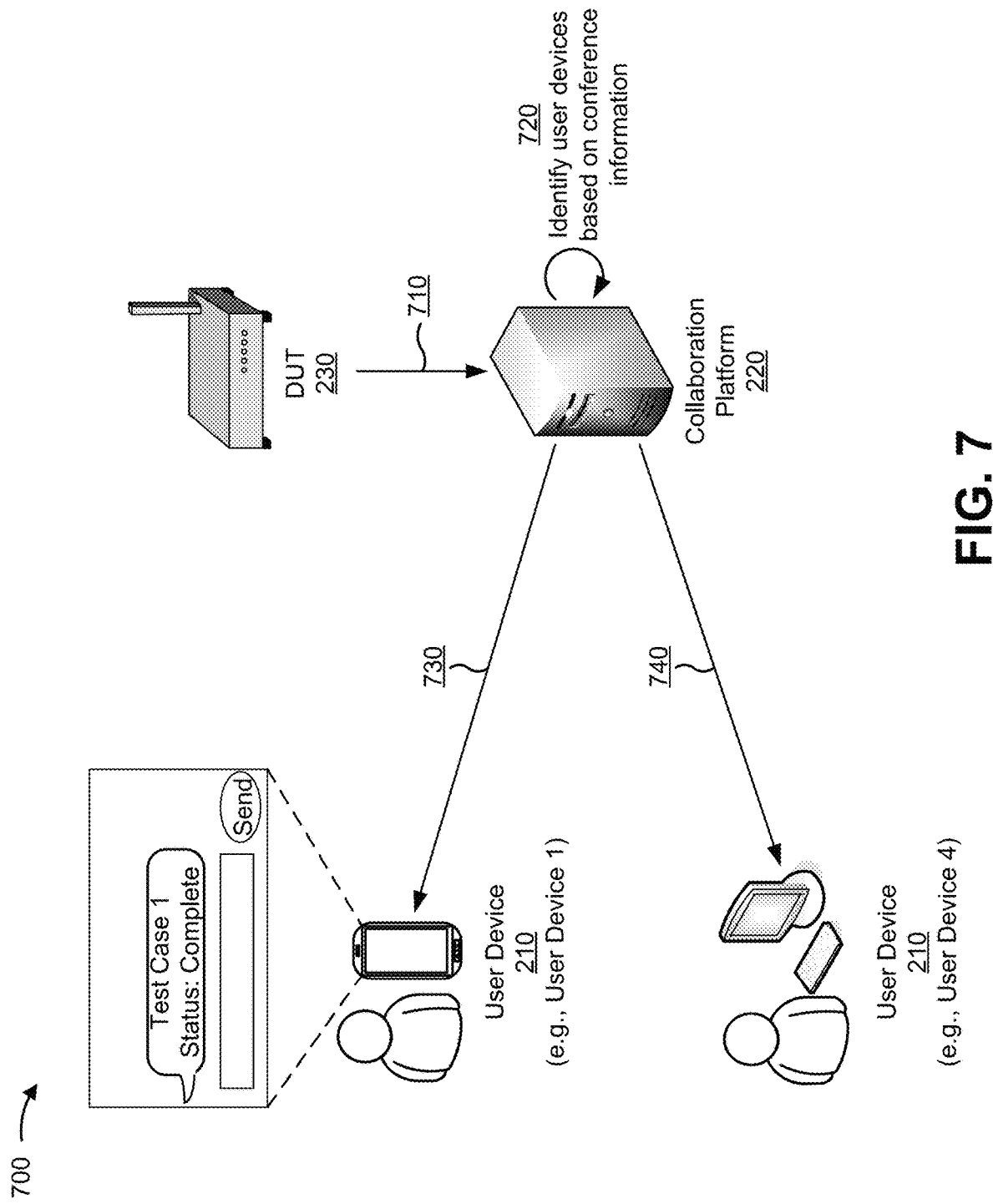
FIG. 7 is another diagram of an example implementation relating to the example process shown in FIG. 4.

FIG. 7 is a diagram of an example implementation 700 relating to the example process shown in FIG. 4. FIG. 7 shows an example of enabling device under test conferencing via a collaboration platform.

As shown in FIG. 7, DUT 230 may allow users of multiple user devices 210 to observe testing of DUT 230. As shown by reference number 710, DUT 230 may provide, to collaboration platform 220, information associated with an execution of a test suite. For example, assume that DUT 230 is executing a test case of the test suite.

As shown by reference number 720, collaboration platform 220 may identify user devices 210 based on conference information. For example, the conference information may include information that identifies a set of user devices 210 that have requested to receive test result data from DUT 230.

As shown by reference numbers 730 and 740, collaboration platform 220 may provide test result data, that was generated by DUT 230, to user devices 210. In some implementations, the test result data may include audio and/or video information that was generated by DUT 230 based on DUT 230 executing the test case. Alternatively, and as shown, the test result data may include information that identifies a status of the execution of the test case. For example, collaboration platform 220 may provide information to a particular user device 210 (e.g., User Device 1), via an instant messaging channel, that identifies a status of the test case that was executed by DUT 230 (e.g., Case 1 is complete).

As indicated above, FIG. 7 is provided merely as an example. Other examples are possible and may differ from what was described with regard to FIG. 7.

Figure 8:
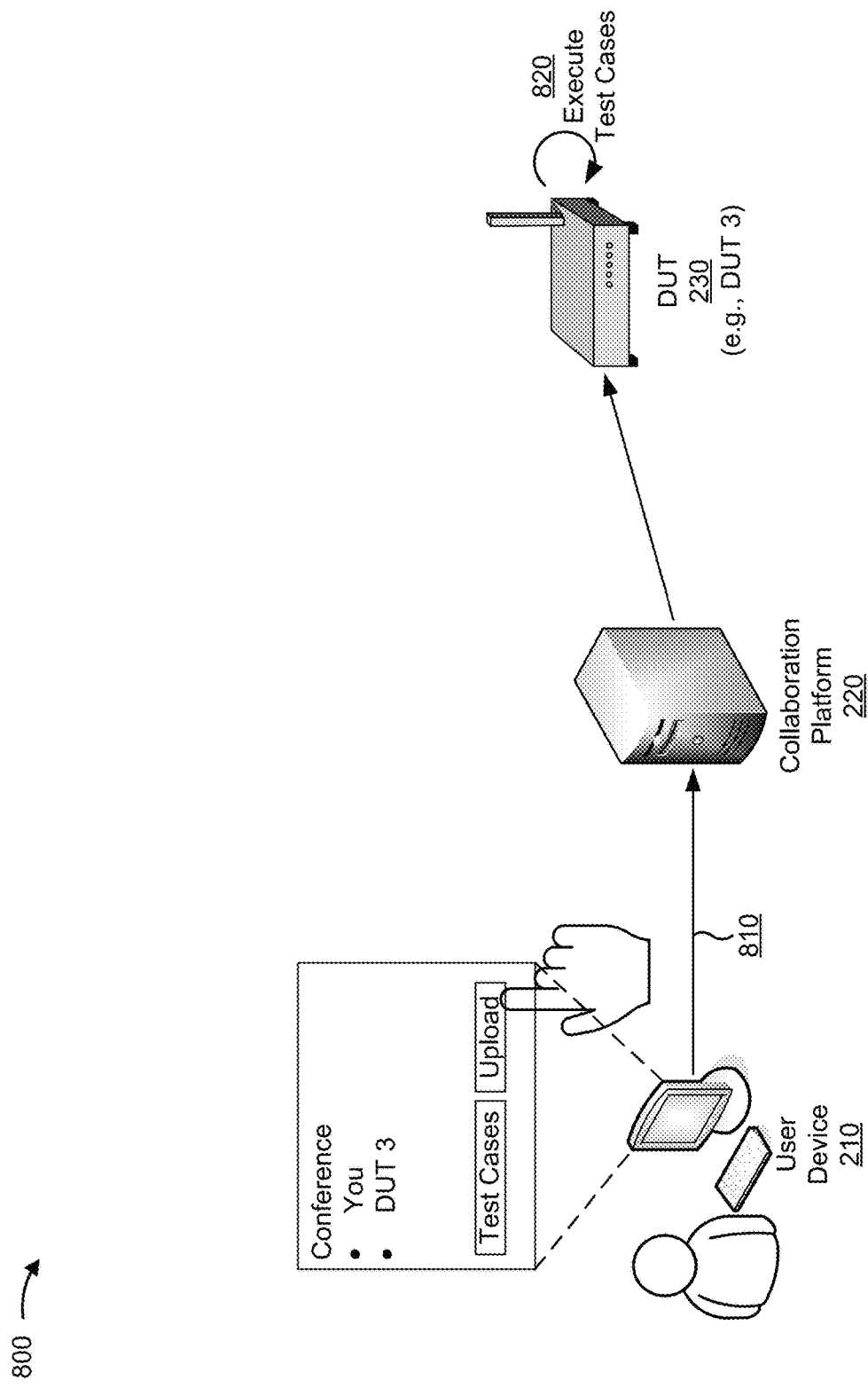
FIG. 8 is another diagram of an example implementation relating to the example process shown in FIG. 4.

FIG. 8 is a diagram of an example implementation 800 relating to the example process shown in FIG. 4. FIG. 8 shows an example of enabling device under test conferencing via a collaboration platform.

As shown in FIG. 8, a user of user device 210 may initiate on-demand testing of DUT 230 using a file transfer. As shown by reference number 810, the user of user device 210 may send a session request via collaboration platform 220 to DUT 230 (e.g., DUT 3, which may automatically accept the session request) and may upload a series of test cases by file transfer to DUT 3 via collaboration platform 220. As shown by reference number 820, DUT 230 may execute the series of test cases automatically. In this case, the user may terminate the session once file transfer to DUT 230 is complete, and DUT 230 may execute the test cases without user device 210 being required to interact with DUT 230 during some or all of the time that DUT 230 continues to execute the test cases. Thereafter, DUT 230 may provide results to collaboration platform 220 and/or user device 210 after executing the test cases, and/or may establish a session with user device 210, via collaboration platform 220, in the event that a problem occurs while executing the test cases.

As indicated above, FIG. 8 is provided merely as an example. Other examples are possible and may differ from what was described with regard to FIG. 8.

Implementations described herein provide connectivity of a set of DUTs and a set of user devices via a collaboration platform (e.g., a set of cloud servers executing a collaboration service, a set of devices to enable remote testing of a DUT, or the like). The collaboration platform may receive, from a DUT, test result data that is to be provided to one or more user devices, such that the one or more user devices may provide, via one or more output components, the information for diagnostic purposes and/or other purposes.

The collaboration platform may identify a user device that is to receive the test result data (e.g., based on a request from the user device, based on a configuration, based on an event, or the like), and may determine network condition information (e.g., a latency value, a bandwidth value, a throughput value, a jitter value, etc.) based on a connection between the collaboration platform and the user device.

The collaboration platform may provide, to the user device, the information based on the network condition information. For example, the collaboration platform may perform a technique (e.g., an encoding technique, a scaling technique, a transcoding technique, or the like) to reduce communication issues and improve the transmission of test result data to the user device, such that testing efficacy is not compromised by current network conditions. In this way, some implementations described herein reduce latency, reduce a number of packet losses, etc., thereby conserving processor and/or memory resources of user devices, and thereby enabling remote testing of DUTs via a network.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A collaboration device, comprising:
a memory; and
one or more processors to:
provide, to a first user device, of a set of user devices that are in communication with the collaboration device, information that identifies, for display on the first user device, a list of devices under test, a status of each of the devices under test, and a status of each of the set of user devices,
the list of the devices under test specifying a first device under test, the first device under test being one of:
a set-top box, a computer, a desktop computer, a laptop computer, a tablet computer, a handheld computer, an Internet of Things (IoT) device, a vending machine, a device executing a web application, a device executing a mobile application, a mobile phone, a gaming device, or a wearable communication device, and
the status of each of the devices under test including information identifying an availability of the first device under test and, for one of the devices under test, information identifying which one of the set of user devices is interacting with the one of the devices under test;
receive, from the first user device and based on providing the information that identifies the list of the devices under test, the status of each of the devices under test, and the status of each of the set of user devices, data identifying a testing operation to be performed on the first device under test,
the data identifying the testing operation comprising text information specifying a command for the first device under test to execute;
cause, based on receiving the data identifying the testing operation, the testing operation to be performed on the first device under test by providing, to the first device under test, an input that causes the first device under test to generate test result data as an output;

receive the test result data, generated by the first device under test, based on performing the testing operation on the first device under test;

receive, from the first user device, a request to record a session between the first user device and the first device under test;

record, based on the request, the session for a second user device to review or share the recorded session;

identify the first user device as a recipient to receive the test result data from the collaboration device and via a network,
- the first user device being one of:
  - a communication device, a computing device, a mobile phone, a laptop computer, a tablet computer, a handheld computer, a gaming device, or a wearable communication device, and
- the first user device controlling operation of the collaboration device and, via the collaboration device, the first device under test,
  - wherein the first user device causes the collaboration device to cause the testing operation to be performed on the first device under test by the first user device providing the text information;

determine network condition information associated with a connection between the first user device and the network,
- the network condition information comprising one of a latency value, a bandwidth value, a throughput value, a jitter value, or an amount of packet loss; and provide, using a technique that is based on the network condition information, the test result data to the first user device,
- wherein the test result data comprises at least one of audio information or video information that is generated by the first device under test based on the input received from the first user device,
  - the at least one of the audio information or the video information being provided to the first user device in real-time with respect to the first device under test generating the at least one of the audio information or the video information, and
- wherein the technique includes at least one of:
  - an encoding technique,
  - an adaptive bit rate streaming technique,
  - a scaling technique,
  - a transcoding technique, or
  - a compression technique.

2. The collaboration device of claim 1, where the one or more processors are further to:
select a particular codec, from a set of codecs, based on the network condition information; and
where the one or more processors, when providing the test result data, are to:
provide the test result data based on selecting the particular codec.

3. The collaboration device of claim 1, where the one or more processors are further to:
determine, based on the network condition information, that a first value associated with the network condition information satisfies a threshold;
perform the technique based on the first value satisfying the threshold; and
where the one or more processors, when providing the test result data, are to:
provide the test result data based on performing the technique.

4. The collaboration device of claim 1, wherein the first user device is located remotely from the collaboration device.

5. The collaboration device of claim 1, where the one or more processors are further to:
save the test result data.

6. The collaboration device of claim 1, where the one or more processors, when providing the information that identifies the list of the devices under test, the status of each of the devices under test, and the status of each of the set of user devices, are to:
provide, to the first user device, instructions that enable the list of the devices under test to be searched.

7. The collaboration device of claim 1, wherein the one or more processors, when identifying the first user device as the recipient, are to:
identify the first user device as the recipient based on the test result data and based on stored information that maps an event and the first user device to be notified based on an occurrence of the event.

8. A method, comprising:
providing, by a collaboration device and to a first user device, of a set of user devices that are in communication with the collaboration device, information that identifies, for display on the first user device, a list of devices under test, a status of each of the devices under test, and a status of each of the set of user devices,
- the list of the devices under test specifying a first device under test, the first device under test being one of:
  - a set-top box, a computer, a desktop computer, a laptop computer, a tablet computer, a handheld computer, an Internet of Things (IoT) device, a vending machine, a device executing a web application, a device executing a mobile application, a mobile phone, a gaming device, or a wearable communication device, and
- the status of each of the devices under test including information identifying an availability of the first device under test and, for one of the devices under test, information identifying which one of the set of user devices is interacting with the one of the devices under test;

receiving, by the collaboration device and from the first user device and based on providing the information that identifies the list of the devices under test, the status of each of the devices under test, and the status of each of the set of user devices, data identifying a testing operation to be performed on the first device under test, the data identifying the testing operation comprising text information specifying a command for the first device under test to execute;

causing, by the collaboration device and based on receiving the data identifying the testing operation, the testing operation to be performed on the first device under test by providing, to the first device under test, an input that causes the first device under test to generate test result data as an output;

receiving, by the collaboration device, the test result data, generated by the first device under test, based on the testing operation;

receiving, by the collaboration device and from the first user device, a request to record a session between the first user device and the first device under test;

recording, by the collaboration device, the session based on the request for a second user device to review or share the recorded session;
identifying, by the collaboration device, the first user device as a recipient to receive the test result data from the collaboration device and via a network,
the first user device being one of:
a communication device, a computing device, a mobile phone, a laptop computer, a tablet computer, a handheld computer, a gaming device, or a wearable communication device, and
the first user device controlling operation of the collaboration device and, via the collaboration device, the first device under test,
wherein the first user device causes the collaboration device to cause the testing operation to be performed on the first device under test by the first user device providing the text information;
determining, by the collaboration device, network condition information associated with a connection between the first user device and the network,
the network condition information comprising one of a latency value, a bandwidth value, a throughput value, a jitter value, or an amount of packet loss; and
providing, by the collaboration device, using a technique that is based on the network condition information, the test result data to the first user device,
wherein the test result data comprises at least one of audio information or video information that is generated by the first device under test based on the input,
the at least one of the audio information or the video information being provided to the first user device in real-time with respect to the first device under test generating the at least one of the audio information or the video information, and
wherein the technique includes at least one of:
an encoding technique,
an adaptive bit rate streaming technique,
a scaling technique,
a transcoding technique, or
a compression technique.

9. The method of claim 8, further comprising:
selecting, from a set of codecs, a codec to use in association with providing the test result data; and
where providing the test result data comprises:
providing the test result data based on selecting the codec.

10. The method of claim 8, further comprising:
establishing the connection with the first user device, the connection being associated with the session; and
where determining the network condition information comprises:
determining the network condition information based on the session.

11. The method of claim 8, further comprising:
determining, based on the network condition information, that a first value associated with the network condition information satisfies a threshold; and
where providing the test result data comprises:
providing the test result data based on the first value satisfying the threshold.

12. The method of claim 8, further comprising:
receiving, from the first user device, information that identifies the input; and where causing the testing operation to be performed comprises:
causing the testing operation to be performed further based on the information that identifies the input.

13. The method of claim 8, where the first user device is located remotely from the collaboration device.

14. The method of claim 8, wherein identifying the first user device as the recipient comprises:
identifying the first user device as the recipient based on the test result data and based on stored information that maps an event and the first user device to be notified based on an occurrence of the event.

15. A non-transitory computer-readable medium storing instructions, the instructions comprising:
one or more instructions that, when executed by one or more processors of a collaboration device, cause the one or more processors to:
provide, to a first user device, of a set of user devices that are in communication with the collaboration device, information that identifies, for display on the first user device, a list of devices under test, a status of each of the devices under test, and a status of each of the set of user devices,
the list of the devices under test specifying a first device under test, the first device under test being one of:
a set-top box, a computer, a desktop computer, a laptop computer, a tablet computer, a handheld computer, an Internet of Things (IoT) device, a vending machine, a device executing a web application, a device executing a mobile application, a mobile phone, a gaming device, or a wearable communication device, and
the status of each of the devices under test including information identifying an availability of the first device under test and, for one of the devices under test, information identifying which one of the set of user devices is interacting with the one of the devices under test;
receive, from the first user device and based on providing the information that identifies the list of the devices under test, the status of each of the devices under test, and the status of each of the set of user devices, data identifying a testing operation to be performed on the first device under test,
the data identifying the testing operation comprising text information specifying a command for the first device under test to execute;
cause, based on receiving the data identifying the testing operation, the testing operation to be performed on the first device under test by providing, to the first device under test, an input that causes the first device under test to generate test result data as an output;
receive, based on performing the testing operation, the test result data generated by the first device under test;
receive, from the first user device, a request to record a session between the first user device and the first device under test;
record, based on the request, the session for a second user device to review or share the recorded session;
identify the first user device as a recipient to receive the test result data from the collaboration device and via a network,
the first user device being one of:

a communication device, a computing device, a mobile phone, a laptop computer, a tablet computer, a handheld computer, a gaming device, or a wearable communication device; and the first user device controlling operation of the collaboration device and, via the collaboration device, the first device under test, wherein the first user device causes the collaboration device to cause the testing operation to be performed on the first device under test by the first user device providing the text information;

determine network condition information associated with a connection between the first user device and the network, the network condition information comprising one of a latency value, a bandwidth value, a throughput value, a jitter value, or an amount of packet loss; and provide, to the first user device and using a technique that is based on the network condition information, the test result data, wherein the test result data comprises at least one of audio information or video information that is generated by the first device under test based on the input received from the first user device, the at least one of the audio information or the video information being provided to the first user device in real-time with respect to the first device under test generating the at least one of the audio information or the video information, and wherein the technique includes at least one of:
an encoding technique,
an adaptive bit rate streaming technique,
a scaling technique,
a transcoding technique, or
a compression technique.

16. The non-transitory computer-readable medium of claim 15, where the one or more instructions, when executed by the one or more processors, further cause the one or more processors to:

perform the encoding technique based on the network condition information; and where the one or more instructions, that cause the one or more processors to provide the test result data, cause the one or more processors to:

provide the test result data based on performing the encoding technique.

17. The non-transitory computer-readable medium of claim 15, where the one or more instructions, when executed by the one or more processors, further cause the one or more processors to:

select a codec based on the network condition information; and where the one or more instructions, that cause the one or more processors to provide the test result data, cause the one or more processors to:

provide the test result data using the codec.

18. The non-transitory computer-readable medium of claim 15, where the collaboration device is located remotely from the first user device.

19. The non-transitory computer-readable medium of claim 15, where the one or more instructions, when executed by the one or more processors, further cause the one or more processors to:

provide a set of test cases to the first device under test; and where the one or more instructions, that cause the one or more processors to receive the test result data, cause the one or more processors to:

receive the test result data based on providing the set of test cases to the first device under test.

20. The non-transitory computer-readable medium of claim 15, where the one or more instructions, when executed by the one or more processors, further cause the one or more processors to:

determine, based on the network condition information, that a first value associated with the network condition information satisfies a threshold; and where the technique is determined based on the first value satisfying the threshold.

* * * * *